US011210643B2

(12) United States Patent
Baber et al.

(10) Patent No.: US 11,210,643 B2
(45) Date of Patent: *Dec. 28, 2021

(54) SYSTEMS AND METHODS FOR PROVIDING CASH REDEMPTION TO A THIRD PARTY

(71) Applicant: Capital One Services, LLC, McLean, VA (US)

(72) Inventors: Angela Baber, Richmond, VA (US); Peter Davey, Powhatan, VA (US); Abhinav Agrawal, Philadelphia, PA (US); Walter Avery Miller, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/450,408

(22) Filed: Jun. 24, 2019

(65) Prior Publication Data

US 2019/0311340 A1    Oct. 10, 2019

Related U.S. Application Data

(63) Continuation of application No. 15/667,012, filed on Aug. 2, 2017, now Pat. No. 10,380,567.

(Continued)

(51) Int. Cl.
*G06Q 20/10* (2012.01)
*G06Q 20/38* (2012.01)
(Continued)

(52) U.S. Cl.
CPC ......... *G06Q 20/1085* (2013.01); *G06Q 20/02* (2013.01); *G06Q 20/10* (2013.01); *G06Q 20/385* (2013.01); *G06Q 20/4012* (2013.01)

(58) Field of Classification Search
CPC .... G06Q 20/1085; G06Q 20/10; G06Q 20/02; G06Q 20/385; G06Q 20/4012
See application file for complete search history.

(56) References Cited

U.S. PATENT DOCUMENTS 8,843,407 B2   9/2014  Tan
2002/0062285 A1  5/2002  Amann et al.
(Continued)

FOREIGN PATENT DOCUMENTS

JP    2011164880 A  *  8/2011
KR    2013113292 A     10/2013

OTHER PUBLICATIONS

Anguelov et al. U.S. Consumers and Electronic Banking, 1995-2003. 90 Fed. Res. Bull. 1 (2004). (Year: 2004).*

*Primary Examiner* — Virpi H Kanervo
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method. Upon receiving a request to provide cash redemption to a third party from a provider client terminal, the system may allocate an amount of cash to a temporary financial account and generate a temporary access code that may be used to access the cash in the temporary financial account. The system may transmit the temporary access code to a recipient client terminal and upon an ATM terminal's receipt of the input access code, the system may authorize the withdrawal of the amount of cash.

20 Claims, 4 Drawing Sheets

Related U.S. Application Data

(60) Provisional application No. 62/402,455, filed on Sep. 30, 2016.

(51) Int. Cl.
    *G06Q 20/40*     (2012.01)
    *G06Q 20/02*     (2012.01)

(56) References Cited

U.S. PATENT DOCUMENTS

| | | | |
|---|---|---|---|
| 2003/0115137 A1 | 6/2003 | Rowe et al. | |
| 2007/0045395 A1* | 3/2007 | Corona | G06Q 40/00 235/379 |
| 2008/0288401 A1* | 11/2008 | Jones | G07F 19/20 705/43 |
| 2009/0024506 A1 | 1/2009 | Houri | |
| 2009/0119159 A1* | 5/2009 | Reardon | G06Q 20/202 705/40 |
| 2010/0082365 A1* | 4/2010 | Noordvyk | G16H 30/40 705/2 |
| 2011/0202466 A1 | 8/2011 | Carter | |
| 2011/0238510 A1 | 9/2011 | Rowen et al. | |
| 2012/0310827 A1 | 12/2012 | Gibson | |
| 2015/0098391 A1* | 4/2015 | Sridhar | H04W 36/0022 370/329 |
| 2015/0112866 A1 | 4/2015 | Muthu et al. | |
| 2015/0324768 A1 | 11/2015 | Filter et al. | |
| 2016/0027005 A1* | 1/2016 | Kurian | G07F 19/20 235/379 |
| 2016/0078416 A1* | 3/2016 | DeLuca | G06Q 20/1085 705/43 |
| 2016/0086166 A1 | 3/2016 | Pomeroy et al. | |
| 2016/0260295 A1* | 9/2016 | Dent | G06Q 20/401 |
| 2017/0324735 A1 | 11/2017 | Wolf | |

* cited by examiner

SYSTEMS AND METHODS FOR PROVIDING CASH REDEMPTION TO A THIRD PARTY

CROSS-REFERENCE TO RELATED APPLICATION

This application is a continuation of, and claims priority under 35 U.S.C. § 120 to, U.S. patent application Ser. No. 15/667,012, filed Aug. 2, 2017, which claims the benefit of, and priority under 35 U.S.C. § 119(e) to, U.S. Provisional Application No. 62/402,455, filed Sep. 30, 2016, the entire contents and substance of which are hereby incorporated fully herein by reference.

FIELD OF THE INVENTION

The presently disclosed subject matter relates generally to systems and methods for providing cash redemption to a third party, particularly systems and methods for generating and transmitting an access code to allow a third party to withdraw cash at an automated teller machine ("ATM").

BACKGROUND

Presently, there are a number of ways for a provider to remotely transfer money to a recipient. For example, the provider may use an automated clearing house ("ACH") transfer, an internal ACH transfer (such as the P2P functionality in Capital One's 360® P2P online banking platform), or third party money transfer systems (e.g., ClearXchange™, Venmo®, Paypal®). However, each of these methods have limitations. For example, a typical ACH transfer may take multiple days to process. An internal ACH transfer may allow for the same day transfer of funds, but may only be performed if the two parties have an account at the same financial institution. Lastly, third party money transfer systems may also have time delays between transferring funds between an account associated with the third party system and an account associated with a primary financial institution (e.g., a bank account) before the recipient may access the funds for withdrawal.

However, there may be situations where a provider desires to remotely transfer cash that is immediately accessible to a recipient that does not have an account at the same financial institution as the provider, and none of the above-described methods enable such a transaction to occur. For example, a student may only have until the end of the day to provide a landlord cash for a security deposit on a highly sought-after apartment, but the student's parents (who live in another state) would not be able to provide the student with access to the necessary cash by the end of the day using the methods described above, unless the student already had an account set up with the same financial institution as the parents.

Accordingly, there is a need for improved devices, systems, and methods that enable a provider to remotely transfer cash to a recipient that does not require both parties to have an account with the same financial institution.

SUMMARY

Disclosed embodiments provide systems and methods for providing cash redemption to a third party.

Consistent with the disclosed embodiments, the system may include one or more memory devices storing instructions, and one or more processors configured to execute the instructions to perform steps of a method to provide cash redemption to a third party. The system may receive a cash redemption request from a first computing device and, in response, generate and transmit an access code to a second computing device that may allow a user of the second computing device to withdraw cash from a financial account associated with the first computing device. The cash redemption request may specify the amount of cash authorized to be withdrawn, the account from which the cash is to be withdrawn, and information identifying the party that is authorized to make the withdraw. Upon an ATM machine receiving the correctly input access code, the system may then authorize the withdrawal of the amount of cash specified in the cash redemption request from the ATM machine.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
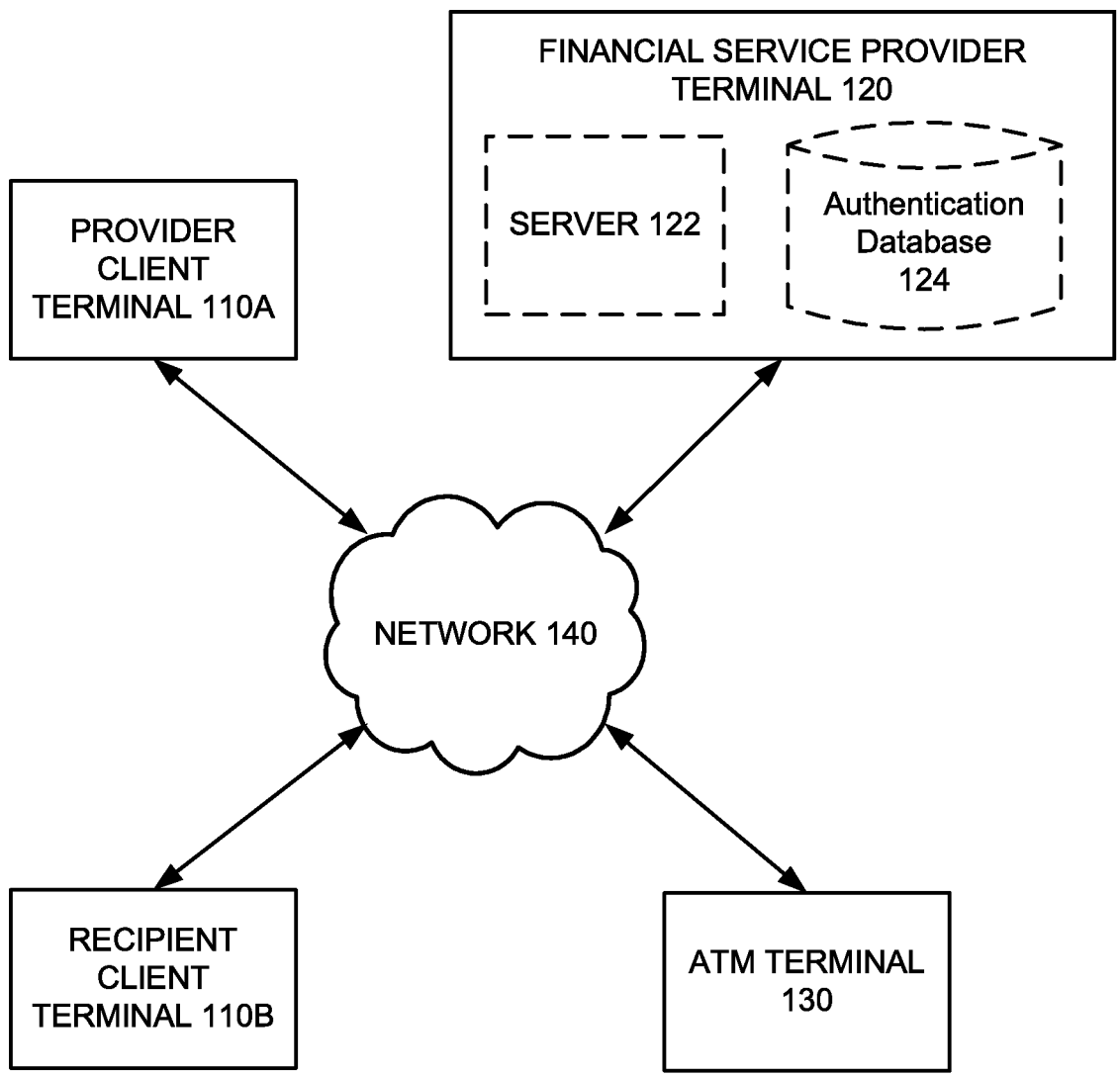
FIG. 1 is a diagram of an exemplary system that may be used for providing cash redemption to a third party.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing cash redemption to a third party. In one aspect, a system for providing cash redemption to a third party is disclosed. Specifically, the system may include one or more memory devices storing instructions, and one or more processors configured to execute the instructions to perform steps of a method. A first computing device of the system may receive a cash redemption request from a second computing device. The cash redemption request may include data representative of a financial account associated with the second computing device, an amount of cash that is authorized for withdrawal from the financial account, and identification information associated with a third computing device. The system may allocate the amount of cash from the financial account into a temporary financial account based on the cash redemption request. The system may generate an access code associated with the temporary financial account and transmit the access code to the third computing device. The system may receive a request to withdraw cash from the temporary financial account from an ATM where the request to withdraw cash may include an attempted access code that was input at an ATM terminal. The system may then determine whether the attempted access code corresponds with the access code, and if so, the system may authorize the withdrawal of cash from the ATM.

The access code associated with the temporary financial account may only be valid for a predetermined period of time. The system may reallocate the remainder of the amount of cash from the temporary financial account to the financial account when the predetermined period of time expires. In some embodiments, the predetermined period of time may begin to accrue upon generation of the access code. In some embodiments, the predetermined period of time may being upon transmission of the access code to the third computing device. In some embodiments, the predetermined period of time may begin to accrue upon transmission of the access code to the third computing device.

In some embodiments, the access code may be a printable access code that includes an account number associated with the temporary financial account, the amount of cash that is authorized for withdrawal from the financial account, and a pin number associated with the temporary financial account.

In some embodiments, the cash redemption request may further include data representative of a predetermined period of time within which the amount of cash is authorized to be withdrawn.

In some embodiments, the first computing device, the financial account, and the temporary financial account may be associated with a financial service provider.

In some embodiments, the system may further receive, by the first computing device, third computing device location data representative of the third computing device. The system may determine, by the first computing device, a location of one or more ATMs within a predetermined location area based on the third computing device location data, wherein the one or more ATMs are associated with the financial service provider. The first computing device may transmit the determined location of the one or more ATMs.

In some embodiments the system may pre-register the third computing device to associate the third computing device with the financial account such that when the system allocates the amount of cash from the financial account into the temporary financial account, the system may first determine whether the third computing device is pre-registered and may only accept the cash redemption request when the third computing device is determined to be pre-registered.

In some embodiments, in response to authorization of the withdrawal of the amount of cash from the ATM, the first computing device may transmit a notification to the second computing device. The notification may include data representative of one or more of the location of the ATM and the time of authorization.

In some embodiments, where the cash redemption request further includes approved location data representative of an approved location for cash withdrawal and the request to withdraw cash further includes ATM location data representative of a location of the ATM, the first computing device may authenticate the request to withdraw cash when the approved location data corresponds with the ATM location data. The first computing device may withhold authorization until the request to withdraw cash is authenticated.

In some embodiments, where the cash redemption request further includes approved location data representative of an approved location for cash withdrawal and the request to withdraw cash further includes ATM location data representative of a location of the ATM, the first computing device may receive third computing device location data representative of a location of the first computing device. Within a predetermined time of receiving the request to withdraw cash, the first computing device may authenticate the request to withdraw cash when the approved location data corresponds with the third computing device location data. The first computing device may withhold authorization until the request to withdraw cash is authenticated.

In another aspect, a method for providing cash redemption at an automated teller machine (ATM) is disclosed. Specifically, the method may include receiving a cash redemption request at a first computing device from a second computing device. The cash redemption request may include data representative of a financial account associated with the second computing device, an amount of cash that is authorized for withdrawal from the financial account, and identification information associated with a third computing device. The method may include allocating the amount of cash from the financial account into a temporary financial account based on the cash redemption request. The method may further include generating an access code associated with the temporary financial account and transmitting the access code to the third computing device. The method may include receiving a request to withdraw cash from the temporary financial account from an ATM where the request to withdraw cash includes an attempted access code that was input at an ATM terminal. The method may further include determining whether the attempted access code corresponds with the access code. When the system determines that the attempted access code corresponds with the access code, the method may further include authorizing the withdrawal of cash from the ATM.

In yet another aspect, a non-transitory computer-readable medium storing instructions is disclosed. The instructions, when executed by one or more processors, may cause a computing device to perform steps of a method for providing cash redemption to a third party. Specifically, a first computing device may receive a cash redemption request from a second computing device. The cash redemption request may include data representative of a financial account associated with the second computing device, an amount of cash that is authorized for withdrawal from the financial account, and identification information associated with a third computing device. The first computing device may allocate the amount of cash from the financial account into a temporary financial account based on the cash redemption request. The first computing device may generate an access code associated with the temporary financial account and transmit the access code to the third computing device. The first computing device may receive a request to withdraw cash from the temporary financial account from an ATM terminal where the request to withdraw cash may include an attempted access code that was input at the ATM terminal. The first computing device may then determine whether the attempted access code corresponds with the access code, and if so, the first computing device may authorize the withdrawal of cash from the ATM.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary system that may be configured to perform one or more software processes that, when executed, provide cash redemption to a third party. The components and arrangements shown in FIG. 1 are not intended to limit the disclosed embodiments as the components used to implement the disclosed processes and features may vary.

In accordance with disclosed embodiments, a third party cash redemption system 100 may include a provider client terminal 110A, a recipient client terminal 110B, a financial service provider terminal 120, and an ATM terminal 130, each communicating with a network 140. According to some embodiments, a provider client terminal 110A may be associated with a first user (e.g., a provider) that desires to send cash to a second user (e.g., a recipient) that is associated with the recipient client terminal 110B. In some embodiments, the first user may have an account (such as a bank account) that is associated with a financial service provider that is associated with the financial services provider terminal 120. Client terminals 110A, B may be connected to financial service provider terminal 120 and ATM terminal 130 directly or via network 140. Financial service provider terminal 120 may be connected to ATM terminal 130 directly or via network 140. Other components known to one of ordinary skill in the art may be included in the third party cash redemption system 100 to process, transmit, provide, and receive information consistent with the disclosed embodiments.

According to some embodiments, system 100 may receive a cash redemption request from provider client terminal 110A. For example, a first user may generate the cash redemption request via provider client terminal 110A to allow a second user, associated with recipient client terminal 110B, to withdraw a specified amount of cash (e.g. $200) from an ATM terminal 130. In response to the cash redemption request, system 100 may allocate an amount of cash specified in the cash redemption request from a financial account into a temporary financial account and generate an access code associated with the temporary financial account that may be used to access the cash in the temporary account. In some embodiments, provider client terminal 110A may be a computer system or device that is operated by a user who has an account that is associated with the financial service provider associated with the financial service provider terminal 120.

Operating in communication with network 140, each of the client terminals 110A, B may be a computer-based system. For example, each of the client terminals 110A, B may include a general purpose or notebook computer, a mobile device with computing ability, a server, a desktop computer, tablet, or any combination of these computers and/or affiliated components. Client terminals 110A, B may include one or more sensors such as a camera, a microphone, a gyroscope, and/or a GPS receiver. Each of the client terminals 110A, B may be configured with storage that stores one or more operating systems that perform known operating system functions when executed by one or more processors. By way of example, the operating systems may include Microsoft Windows™, Unix™, Linux, Apple™ operating systems, Personal Digital Assistant (PDA) type operating systems, such as Microsoft CE™, or other types of operating systems. Accordingly, disclosed embodiments may operate and function with computer systems running any type of operating system. The client terminals 110A, B may also include communication software that, when executed by a processor, provides communications with network 140, such as Web browser software, tablet, or smart hand held device networking software, etc. Each of the client terminals 110A, B may be a device that executes mobile applications, such as a tablet or mobile device.

Financial service provider terminal 120 may allow a financial service provider, such as a bank, a credit card company, a merchant, a lender, and the like, to offer and provide third party cash redemption to recipients on behalf of a provider. Financial service provider terminal 120 may be a computer-based system including computer system components, such as one or more servers, desktop computers, workstations, tablets, hand held computing devices, memory devices, and/or internal network(s) connecting the components. As shown in FIG. 1, financial service provider terminal 120 may include a server 122 and/or an authentication database 124. An authentication database 124 may provide a database of credentials, such as, for example, usernames, logins, passwords, pin numbers, account numbers, security questions, and other such authentication data, that may be used to verify the identity of a user accessing the system.

ATM terminal 130 may be associated with an ATM machine that may allow a recipient to withdraw cash from an account associated with a financial service provider. ATM terminal 130 may include one or more I/O devices that may comprise one or more interfaces for receiving signals or input from devices and providing signals or output to one or more devices that allow data to be received and/or transmitted by an input device, such as a keyboard or a touch screen, for receiving user inputs, such as pin numbers, access codes, indications of an amount of cash desired to be withdrawn, and other such input information. ATM terminal 130 may be a computer-based system including computer system components, such as one or more servers, desktop computers, workstations, tablets, hand held computing devices, memory devices, and/or internal network(s) connecting the components.

Network 140 may comprise any type of computer networking arrangement used to exchange data. For example, network 140 may be the Internet, a private data network, or a virtual private network using a public network such as the Internet. Network 140 may also include a public switched telephone network ("PSTN") and/or a wireless network.

To communicate over network 140, a computing device associated with provider client terminal 110A, recipient client terminal 110B, financial service provider terminal 120, or ATM terminal 130 may be a mobile computing device (e.g., a smart phone, tablet computer, smart wearable device, or portable laptop computer) or a stationary computing device (e.g., a stationary desktop or laptop computer). Being mobile, in some embodiments, may advantageously allow one or more of the client terminals 110A, B to communicate with other devices in the third party cash redemption system 100 from a predetermined location or area (e.g., at an ATM location).

Figure 2:
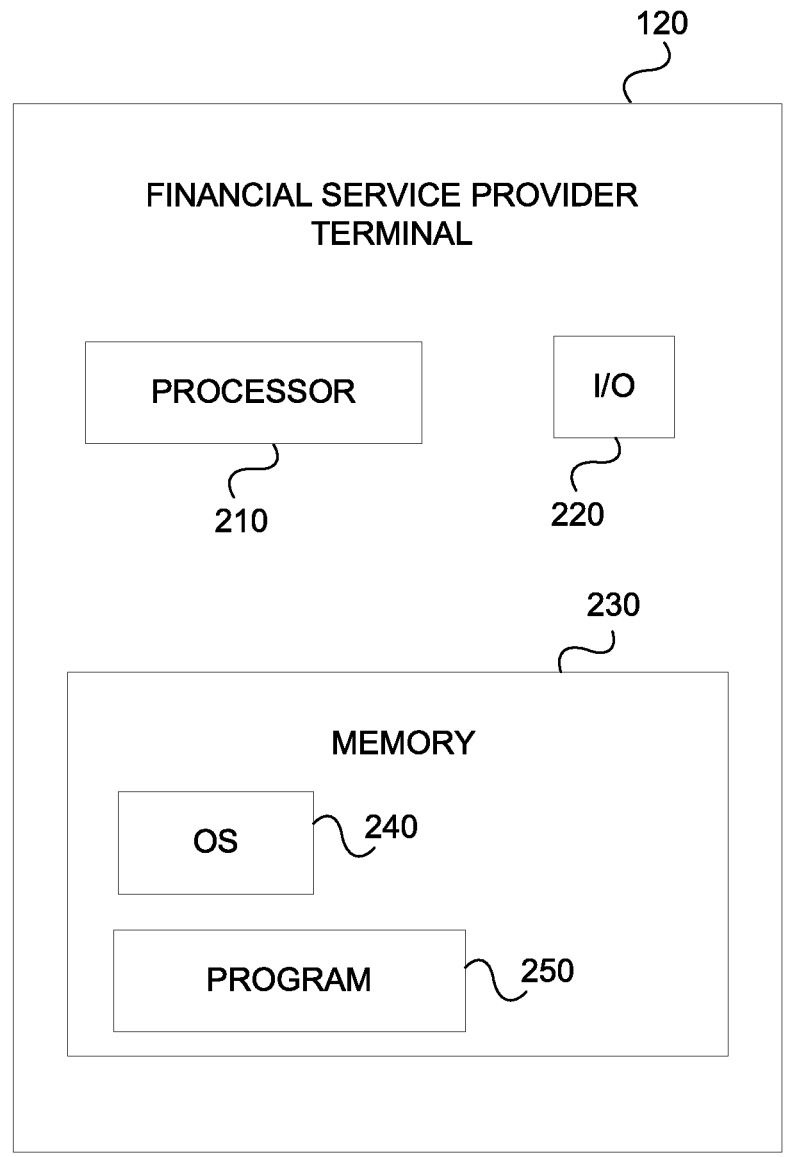
FIG. 2 is a component diagram of an exemplary financial service provider terminal.

Financial service provider terminal 120 is shown in more detail in FIG. 2. Client terminals 110A, B and ATM terminal 130 may have a similar structure and components that are similar to those described with respect to financial service provider terminal 120. As shown, financial service provider terminal 120 may include a processor 210, an input/output ("I/O") device 220, a memory 230 containing an operating system ("OS") 240 and a program 250. For example, financial service provider terminal 120 may be a single server or may be configured as a distributed computer system including multiple servers or computers that interoperate to perform one or more of the processes and functionalities associated with the disclosed embodiments. In some embodiments, the financial service provider terminal 120 may further include a display (or a display interface), a peripheral interface, a transceiver, a mobile network interface in communication with the processor 210, a bus configured to facilitate communication between the various components of the financial service provider terminal 120, and a power source configured to power one or more components of the financial service provider terminal 120. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The financial service provider terminal may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow server 200 to execute multiple processes simultaneously. One of ordinary skill in the art would understand that other types of processor arrangements could be implemented that provide for the capabilities disclosed herein.

Financial service provider terminal 120 may include one or more storage devices configured to store information used by processor 210 (or other components) to perform certain functions related to the disclosed embodiments. In one example, financial service provider terminal 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, financial service provider terminal 120 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, financial service provider terminal 120 may include memory 230 that may include one or more programs 250 to perform one or more functions of the disclosed embodiments. Moreover, processor 210 may execute one or more programs 250 located remotely from the third party cash redemption system 100. For example, the third party cash redemption system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Financial service provider terminal 120 may also be communicatively connected to one or more memory devices (e.g., databases (not shown)) locally or through a network (e.g., network 140). The remote memory devices may be configured to store information and may be accessed and/or managed by financial service provider terminal 120. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Financial service provider terminal 120 may also include one or more I/O devices 220 that may comprise one or more interfaces for receiving signals or input from devices and providing signals or output to one or more devices that allow data to be received and/or transmitted by financial service provider terminal 120. For example, financial service provider terminal 120 may include interface components, which may provide interfaces to one or more input devices, such as one or more keyboards, mouse devices, touch screens, track pads, trackballs, scroll wheels, digital cameras, microphones, sensors, and the like, that enable financial service provider terminal 120 to receive data from one or more users. In other exemplary embodiments, the I/O devices 220 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the financial service provider terminal 120 may include any number of hardware and/or software applications that are executed to facilitate any of the operations. In example implementations, one or more I/O interfaces facilitate communication between the financial service provider terminal 120 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the financial service provider terminal 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the financial service provider terminal 120 may include a greater or lesser number of components than those illustrated.

Figure 3:
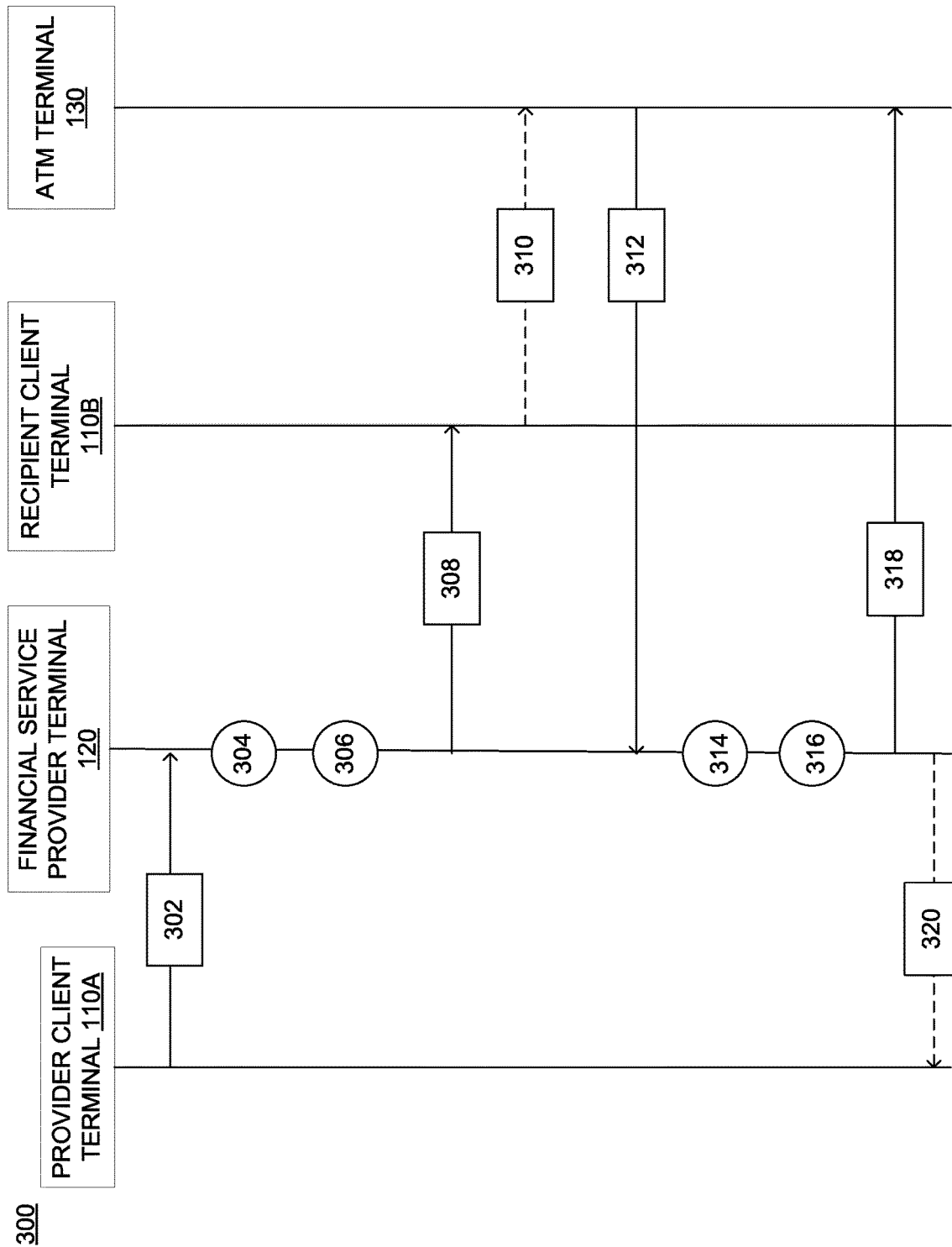
FIG. 3 is a diagram of a method of using a third party cash redemption system, according to an example embodiment.

FIG. 3 illustrates a diagram of a method of using a third party cash redemption system, according to an exemplary embodiment. As shown, the provider client terminal 110A may transmit 302 a cash redemption request to the financial service provider terminal 120. In some embodiments, a cash redemption request may include data representative of (1) a financial account associated with the provider client terminal 110A or a user of the provider client terminal 110, (2) an amount of cash that is authorized for withdrawal from the financial account, and (3) identification information associated with a recipient client terminal 110B or a user associated with the recipient client terminal 110B. Identification information may include a user's given name, screen name, phone number, address, email address, account number, or any other such suitable information. Data representative of a financial account may include, for example, an account number, a routing number, an account type (e.g., savings, checking, etc.), and the identity of the financial service provider hosting the account. In some embodiments, the cash redemption request may include data representative of a predetermined period of time within which the amount of cash is authorized to be withdrawn. For example, the cash redemption request may specify a particular time and date after which the withdrawal of the amount of cash is no longer authorized. In some embodiments, a user of the provider client terminal 110A may specify one or more approved locations (e.g., proximity to a location of an ATM) from which the withdrawal may be made. Accordingly, in some embodiments, the cash redemption request may include data representative of one or more approved locations.

After receiving the cash redemption request, the financial service provider terminal 120 may allocate 304 the amount of cash from the financial account into a temporary financial account based on the cash redemption request. For example, in some embodiments, the financial service provider terminal 120 may transfer the amount of cash from the financial account into a sub-account. According to some embodiments, access to the temporary financial account may be restricted such that cash or other valuables contained therein may only be accessed for withdrawal upon being provided with information associated with the identification information included in the cash redemption request. According to some embodiments, the financial service provider terminal 120, the financial account, and the temporary financial account may all be associated with a financial service provider. In some embodiments, the recipient client terminal 110B may be pre-registered to associate it with the financial account associated with the provider client terminal 110A before the financial service provider terminal 120 will accept the cash redemption request. This pre-registration of recipient devices (e.g., a device belonging to a child or family member) may provide an additional layer of security within system 100, thereby preventing cash withdrawal via an un-registered device (e.g., associated with an unintended recipient).

In some embodiments, the financial service provider terminal 120 may generate 306 an access code associated with the temporary financial account. According to some embodiments, an access code may be a string of alphanumeric characters such as a pin number, a scannable image such as a QR code, a transmittable radio frequency signal, or any other suitable form of access code that is known in the art. In some embodiments, the access code may be a printable access code that is made up of an account number associated with the temporary financial account, the amount of cash that is authorized for withdrawal from the financial account, and a pin number associated with the temporary financial account. Accordingly, in some embodiments, a printable access code may be transmitted to a recipient via email so that the recipient may print the access code. For example, if the access code includes a QR code, the recipient may take a print out of the access code to be scanned by a scanner of an ATM (or other redemption device) in order to redeem cash (or other value). In some embodiments, a printable access code may be sent directly to a printer connected to network 140 by financial service provider terminal 120. Alternatively, if the access code is an alphanumeric string, instead of printing the access code, the recipient may also simply memorize or write the access code down upon, for example, receiving it in an email. In this way, a recipient that does not possess a smartphone may nonetheless be enabled by the system 100 to receive and utilize an access code to redeem cash from a provider. In some embodiments, the access code may include an account number of the temporary financial account. In some embodiments, the access code may be valid for a predetermined amount of time after it is generated by the financial service provider terminal 120. That is, to provide an additional layer of security within system 100 and help prevent cash withdrawal by an unintended recipient, the access code may expire after the predetermined amount of time passes. In some embodiments, the access code may be valid for a predetermined amount of time after it is transmitted to the recipient client terminal 110B. According to some embodiments, the access code may be valid for a user-inputted amount of time provided via the provider client terminal 110A (e.g., by the provider). In some embodiments, the access code may become invalid in response to the financial service provider terminal 120 receiving a command from the provider client terminal 110A to invalidate the access code. According to some embodiments, upon the access code becoming invalid or expiring, the financial service provider terminal 120 may reallocate any funds in the temporary financial account back to the financial account associated with the provider client terminal 110A.

The financial service provider terminal 120 may then transmit 308 the access code to recipient client terminal 110B, based on the identification information in the cash redemption request. For example, in some embodiments, the financial service provider terminal 120 may identify the recipient client terminal 110B based on the identification information and text an access code to the phone number associated with the recipient client terminal 110B. The access code may be transmitted via SMS, email, phone call, through a mobile application, or through any other such suitable means. In some embodiments, the access code may be transmitted in response to the financial service provider terminal 120 receiving a transmission from the recipient client terminal 110B or the ATM terminal 130. For example, in some embodiments as previously noted, the access code may only be valid for a predetermined period of time after being sent by the financial service provider terminal 120. As such, and to increase security, the recipient client terminal 110B may wait until it enters a predetermined area surrounding an ATM machine that is compatible with system 100 before prompting the financial service provider terminal 120 to send the access code.

After providing the access code to the recipient client terminal 110B, the system 100 may receive a cash withdrawal request (e.g., when the recipient using the recipient client terminal 110B attempts to withdraw cash from an ATM machine using the access code). For example, in some embodiments, when the access code includes a pin number that was texted to the recipient client terminal 110B, the system 100 may receive the pin number via ATM terminal 130 of an ATM machine. In some embodiments, the ATM terminal 130 may receive an indication of the access code through an input interface (e.g., through a user typing in a pin number in a key pad of the ATM terminal 130). In some embodiments, the recipient client terminal 110B may be used to enter the access code. For example, the ATM terminal 130 may include a scanner that may scan a QR code displayed by the recipient client terminal, or the ATM terminal 130 may wirelessly receive the access code from the recipient client terminal 110B via Bluetooth, for example.

After receiving the access code from the user or the recipient client terminal 110B, the ATM terminal 130 may transmit 312 a request to withdraw cash to the financial service provider terminal 120. In some embodiments, the request to withdraw cash may include data indicative of the input access code that was received by the ATM terminal (the "attempted access code"), data indicative of the amount of cash that was requested for withdrawal, time data indicating the date and time of the request, and location data indicating the location of the ATM machine associated with the ATM terminal 130 that received the attempted access code. The financial service provider terminal 120 may determine 314 whether the access code associated with the temporary account matches the attempted access code received from the ATM terminal 130 as a part of the request to withdraw cash, and if so, the financial service provider terminal 120 may authorize 316 the withdrawal of the amount of cash from the ATM machine. In some embodiments, the financial service provider terminal 120 may only authorize 316 the withdrawal of the amount of cash after first authenticating that the request to withdraw cash from the temporary financial account originated from an ATM terminal 130 associated with an ATM machine that corresponds to an approved location. In some embodiments, the request to withdraw cash from the temporary financial account must be authenticated within a predetermined amount of time after receiving the request to withdraw cash from the temporary financial account, or the cash may be withheld from withdrawal. After authorizing 316 the withdrawal of the amount of cash, the financial service provider terminal 120 may transmit 318 the authorization to the ATM terminal 130 and responsive to receiving the authorization, the ATM terminal 130 may cause the ATM machine to dispense the amount of cash specified by the request to withdraw cash.

In some embodiments, the financial service provider terminal 120 may receive location data indicative of the location of the recipient client terminal 110B. For example, in some embodiments, after the financial service provider terminal 120 transmits the access code to the recipient client terminal 110B, the recipient client terminal 110B may transmit data indicative of the location of the recipient client terminal 110B (e.g., GPS data) to the financial service provider terminal 120. Based on the data indicative of the location of the recipient client terminal 110B, the financial service provider terminal 120 may determine the location of one or more ATM machines that are near to the recipient client terminal 110B and may transmit the location of the one or more ATM machines to the recipient client terminal 110B to assist in guiding the user of the recipient client terminal 110B to a nearby ATM.

According to some embodiments, after authorizing the withdrawal of the cash, the financial service provider terminal 120 may transmit 320 a notification to the provider client terminal 110A. In some embodiments, the notification may include a message indicating the amount of cash that has been withdrawn. In some embodiments, the notification may include information indicative of the time that the withdrawal was authorized or carried out. In some embodiments, the notification may include data indicative of the location of the ATM where the request to withdraw cash was made.

Figure 4:
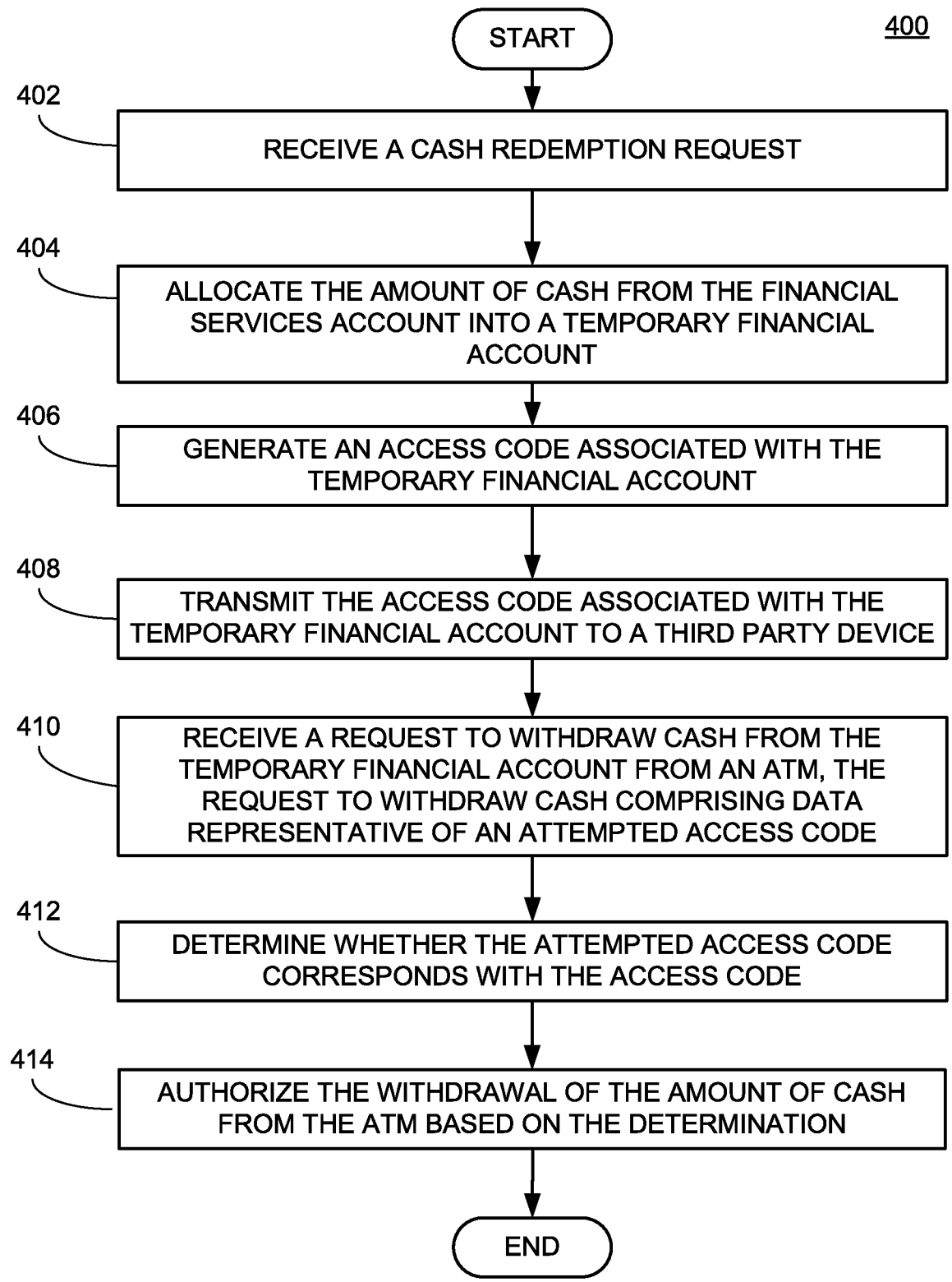
FIG. 4 is a flowchart of an exemplary method for providing cash redemption to a third party.

FIG. 4 shows a flowchart of method 400 providing cash redemption to a third party. Method 400 may be performed by financial service provider terminal 120, using processor 210 to execute memory 230. Following method 400, the financial service provider may enable a first user (i.e., a provider using provider client terminal 110A) to remotely provide a second user (i.e., a recipient using recipient client terminal 110B) with the immediate ability to remove up to a specified amount of cash from an ATM from an account associated with the first user.

In block 402, the financial service provider terminal 120 may receive a cash redemption request from, for example, a provider client terminal 110A. As described above, a cash redemption request may include a financial account associated with the provider client terminal 110A, an amount of cash that is authorized for withdrawal from the financial account, and identification information associated with a recipient client terminal 110B.

In block 404, the financial service provider terminal 120 may allocate the amount of cash specified in the cash redemption request from the financial account to a temporary financial account. In block 406, the financial service provider terminal 120 may generate an access code associated with the temporary financial account. In block 408, the financial service provider terminal 120 may transmit the access code associated with the temporary financial account to a third party device, such as the recipient client terminal 110B. In block 410, the financial service provider terminal 120 may receive a request to withdraw cash from the temporary financial account from the ATM, where the request to withdraw cash from the temporary financial account from the ATM includes data that is representative of an attempted access code. An attempted access code may be an access code received by the ATM terminal 130 from the recipient client terminal 110B or from a user associated with the recipient client terminal 110B. Next, as shown in block 412, the financial service provider terminal 120 may determine whether the attempted access code corresponds with the access code. When it does, in block 414, the financial service provider terminal 120 may authorize the withdrawal of the amount of cash from the ATM machine.

Exemplary Use Case

The following exemplary use case describes one example of a typical user flow pattern. It is intended solely for explanatory purposes and not in limitation. In this example, a provider may desire to convey an amount of cash to a recipient using the system 100 described herein. The system may receive a request (e.g., submitted by the provider) via a mobile device or computer (e.g. provider client terminal 110A) to provide a recipient with, for example, $200. The request may include information indicative of the identity of the intended recipient, and identify the account (e.g., checking, savings, etc.) from which the funds are to be withdrawn. The request may also optionally include information that specifies a range of times and/or locations within which the money must be withdrawn. For example, the request may specify, that the money must be withdrawn by Friday at 4:00 PM at one of three ATMs that are located on a specified college campus. Additionally, a mobile device or computer (e.g., recipient client terminal 110B) associated with the recipient may be pre-registered (e.g., by the provider) such that the system 100 may only authorize withdrawal of the funds in response to a request from the pre-registered device or when the pre-registered device is determined to be within a predetermined location (e.g., within 100 feet of the ATM at the on-campus library).

Upon receiving the request, the system 100 may allocate $200 from the provider's bank account to a temporary financial account to be available for withdraw by the recipient. The recipient (e.g. the recipient client terminal 110B) may receive a notification from the system 100 informing them of the request. If the request specified a range of times and/locations within which the money must be withdrawn, the notification will inform the recipient of these restrictions. In some embodiments, in addition to the notification, the system 100 may send an access code to the recipient's device (e.g., recipient client terminal 110B), which the recipient may use to withdraw the money at an ATM machine. For example, the system 100 may text a pin number or email a QR code to the recipient's device. In some embodiments, the access code may only be valid for a predetermined amount of time and to successfully withdraw the money the recipient must input the access code at an ATM before the access code expires or becomes invalid. In some embodiments, because the access code may expire after a predetermined amount of time of being sent to the recipient's device, the system 100 may only send the access code to the recipient's device (e.g., recipient client terminal 110B) after first being prompted to do so. For example, the recipient's device (e.g., recipient client terminal 110B) may receive a notification that the request was submitted via the provider's device (e.g., provider client terminal 110A), and then two hours later when the recipient is nearby to an ATM machine, the recipient may use the recipient's device (e.g., recipient client terminal 110B) to prompt the system 100 to provide the access code. The system 100 may then send the access code to the recipient's device (e.g., recipient client terminal 110B) and then the recipient may only have, for example, 15 minutes to successfully input the access code at an ATM to withdraw the money. If the recipient does not input the access code at an ATM machine within the time before the access code expires or becomes invalid, then the system 100 may prevent withdrawal of the money. Likewise, if the recipient attempts to enter the access code at an ATM machine that is outside of the locations specified by the cash redemption request, then the system 100 may prevent withdrawal of the money. In some embodiments, a provider may decide that they no longer want to provide the recipient with access to the money and may, via the provider's device (e.g., provider client terminal 110A), send a cancellation request to the system 100 to invalidate the access code, thereby cancelling the cash redemption request. If this occurs, the system 100 may send a second notification to the recipient's device (e.g., recipient client terminal 110B) to inform the recipient that the cash redemption request has been cancelled.

In some embodiments, the ATM machine may receive an indication of the access code (e.g., by a user typing in a pin number on a keypad of the ATM). In some embodiments, the ATM machine may receive the access code by receiving a wireless (e.g., Bluetooth) transmission from a mobile device or scanning and decoding an image (e.g., a QR code) from a mobile device. Upon the AM successfully receiving the access code, the ATM may receive an indication of an amount of money to be withdrawn from the temporary account, up to and including the amount of cash that is authorized for withdrawal as included in the cash redemption request. Upon the ATM dispensing the money, the system may send a notification to the provider's device to inform the provider of the amount of money that was withdrawn, the time it with withdrawn, and/or the location from which it was withdrawn.

In some embodiments, the systems and methods described herein may be utilized for providing redemption for value other than cash. For example, the systems and methods herein may be used to provide valuable item redemption for store credit, coupons, discounts, gift cards, or any other type of valuable item that may be stored in an account associated with a user. Accordingly, the system may include a valuable item dispensing device that may print a coupon, gift card, or redeemable receipt representing the transfer a valuable item out of a first user's account and into the hands of a second user.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory computer-readable medium comprising instructions that, when executed by a recipient computing device, cause the recipient computing device to:
  receive a cash redemption request from a sender computing device, the cash redemption request comprising:
    an amount of cash being sent from a temporary financial account;
    a range of time in which the amount of cash may be withdrawn;
    an approved set of locations of one or more automated teller machines (ATMs) at which the amount of cash may be withdrawn; and
    an access code;
  generate, from data received from a global positioning system (GPS) receiver, location data for the recipient computing device;
  transmit the location data to a financial service provider terminal;
  receive, from the financial service provider terminal, a second set of locations of one or more ATMs corresponding to at least a portion of the approved set of locations, the second set of locations being within a predetermined distance from the recipient computing device;
  generate a representation of the access code; and
  provide the representation of the access code to an ATM to cause the ATM to dispense the amount of cash, wherein an ATM location of the ATM corresponds to the approved set of locations and the second set of locations.

2. The computer-readable medium of claim 1, wherein the access code is valid for a predetermined period of time.

3. The computer-readable medium of claim 2, wherein the instructions, when executed by the recipient computing device, further cause the recipient computing device to:
  receive input from a user including the access code, wherein the predetermined period of time begins upon receiving the input.

4. The computer-readable medium of claim 1, wherein the sender computing device does not send the access code to the recipient computing device until the location data indicates the recipient computing device is within the predetermined distance from the ATM.

5. The computer-readable medium of claim 1, wherein the instructions, when executed by the recipient computing device, further cause the recipient computing device to display the representation of the access code on a display interface.

6. The computer-readable medium of claim 5, wherein:
  the representation of the access code is a quick response (QR) code readable by the ATM; and
  the access code is provided to the ATM by displaying the access code on the display interface.

7. The computer-readable medium of claim 1, wherein the representation of the access code is provided to the ATM by transmitting the representation of the access code to the ATM via an antenna interface.

8. The computer-readable medium of claim 1, wherein the instructions, when executed by the recipient computing device, further cause the recipient computing device to:
  pre-register the recipient computing device with a financial account associated with the sender computing device, wherein the sender computing device does not send the access code to the recipient computing device until the recipient computing device is pre-registered.

9. A method for receiving cash at an automated teller machine (ATM), the method comprising:
  receiving, by a recipient computing device from a sender computing device, a cash redemption request comprising:
    an amount of cash being sent from a temporary financial account;
    a range of time in which the amount of cash may be withdrawn;
    an approved set of locations of one or more automated teller machines (ATMs) at which the amount of cash may be withdrawn; and
    an access code;
  generating, by the recipient computing device, from data received from a global positioning system (GPS) receiver, location data for the recipient computing device;
  transmitting, by the recipient computing device, the location data to a financial service provider terminal;
  receiving, by the recipient computing device, from the financial service provider terminal, a second set of locations of one or more ATMs corresponding to at least a portion of the approved set of locations, the second set of locations being within a predetermined distance from the recipient computing device;
  generating, by the recipient computing device, a representation of the access code; and
  providing, by the recipient computing device, the representation of the access code to an ATM to cause the ATM to dispense the amount of cash, wherein an ATM location of the ATM corresponds to the approved set of locations and the second set of locations.

10. The method of claim 9, wherein the access code is valid for a predetermined period of time.

11. The method of claim 10, further comprising:
  receiving, by the recipient computing device, input from a user including the access code, wherein the predetermined period of time begins upon receiving the input.

12. The method of claim 9, wherein the sender computing device does not send the access code to the recipient computing device until the location data indicates the recipient computing device is within the predetermined distance from the ATM.

13. The method of claim 9, further comprising:
displaying, by the recipient computing device, the representation of the access code on a display interface.

14. The method of claim 13, wherein:
the representation of the access code is a quick response (QR) code readable by the ATM; and
the access code is provided to the ATM by displaying the access code on the display interface.

15. The method of claim 9, wherein the representation of the access code is provided to the ATM by transmitting the representation of the access code to the ATM via an antenna interface.

16. The method of claim 9, further comprising:
pre-registering the recipient computing device with a financial account associated with the sender computing device, wherein the sender computing device does not send the access code to the recipient computing device until the recipient computing device is pre-registered.

17. A system for receiving cash at an automated teller machine (ATM), the system comprising:
one or more transceivers of a recipient computing device configured to send and receive at least one of wired communications or wireless communications;
one or more processors of the recipient computing device; and
a memory of the recipient computing device, in communication with the one or more processors and the one or more transceivers, storing instructions that, when executed by the one or more processors, cause the one or more processors to:
receive a cash redemption request from a sender computing device, the cash redemption request comprising:
an amount of cash being sent from a temporary financial account;
a range of time in which the amount of cash may be withdrawn;
an approved set of locations of one or more automated teller machines (ATMs) at which the amount of cash may be withdrawn; and
an access code;
generate, from data received from a global positioning system (GPS) receiver, location data for the recipient computing device;
transmit the location data to a financial service provider terminal;
receive, from the financial service provider terminal, a second set of locations of one or more ATMs corresponding to at least a portion of the approved set of locations, the second set of locations being within a predetermined distance from the recipient computing device;
generate a representation of the access code; and
provide the representation of the access code to an ATM to cause the ATM to dispense the amount of cash, wherein an ATM location of the ATM corresponds to the approved set of locations and the second set of locations.

18. The system of claim 17, wherein:
the representation of the access code comprises at least one of a string of alphanumeric characters or a personal identification number,
the ATM further comprises a key pad; and
the representation of the access code is received at the ATM via the key pad.

19. The system of claim 17, wherein:
the representation of the access code comprises a quick response (QR) code;
the ATM further comprises a scanner for scanning QR codes; and
the representation of the access code is received at the ATM by scanning the QR code with the scanner.

20. The system of claim 19, wherein the QR code is displayed on a screen of the recipient computing device or printed on a receipt.

\* \* \* \* \*